United States Patent
Christman et al.

[15] 3,697,814
[45] Oct. 10, 1972

[54] BRIDGE RECTIFIER HEAT SINK ASSEMBLY

[72] Inventors: Willard A. Christman; Billy R. Jones, both of Anderson, Ind.

[73] Assignee: General Motors Corporation, Detroit, Mich.

[22] Filed: June 21, 1971

[21] Appl. No.: 154,900

[52] U.S. Cl..................317/100, 29/626, 317/234 A
[51] Int. Cl.................................................H01l 1/12
[58] Field of Search.........310/68 D; 317/100, 234 A; 174/DIG. 5, 15 R, 16 R; 29/626

[56] References Cited

UNITED STATES PATENTS

| | | |
|---|---|---|
| 3,538,362 | 11/1970 | Cheetham................310/68 D |
| 3,536,960 | 10/1970 | Otteson.....................317/100 |

Primary Examiner—Lewis H. Myers
Assistant Examiner—Gerald P. Tolin
Attorney—E. W. Christen et al., C. R. Meland and Richard G. Stahr

[57] ABSTRACT

A bridge rectifier assembly and method for manufacture includes a pair of heat sinks in mating relationship for forming a center opening wherein two groups of oppositely poled semi-conductor diodes are mounted on mutually facing interior walls of the pair of heat sinks. An insulating plate extends across one end of the pair of heat sinks to cover one end of the center opening. The inner side of the insulating plate includes an integral set of spacer blocks and stud fasteners. Opposing slots formed in the interior walls receive the stud fasteners to attach the pair of heat sinks together and to the insulating plate. This positions the spacer blocks within the center opening and between the diodes. A terminal board covers the center opening at the opposite end of a pair of heat sinks and is held in place by the free ends of the spacer blocks. Input terminals carried by the terminal board are connected to the diodes to complete the assembly.

4 Claims, 6 Drawing Figures

PATENTED OCT 10 1972

3,697,814

INVENTORS
Willard A. Christman &
BY Billy R. Jones
L. Warren Smith
ATTORNEY

INVENTORS
Willard A. Christmans
BY    Billy R. Jones
R. Warren Smith
ATTORNEY

BRIDGE RECTIFIER HEAT SINK ASSEMBLY

This invention relates to bridge rectifier assemblies and a method of manufacture therefor having a pair of heat sinks supporting rectifier devices in electrical and thermal conducting relationship, and more particularly to a bridge rectifier assembly having a pair of diode supporting heat sinks attached together by stud fasteners carried on an insulating plate in which the insulating plate forms a self-contained jig for positioning the assembly parts during fabrication.

It is known to use bridge rectifier assemblies as integral circuit packages for ease in manufacturing and installation in electrical apparatus. In one such example, a bridge rectifier assembly is included in alternating current generators for use in motor vehicles as disclosed and claimed in U.S. Pat. No. 3,538,362 issued Nov. 3, 1970 to R. A. Cheetham et al. and assigned to the assignee of this invention. The bridge rectifier assembly disclosed in this patent includes a pair of heat sinks supporting rectifier devices within a center opening. A thermal setting insulating compound is applied in a liquid state to the center opening and to opposing slots formed in the heat sinks for encapsulating the diodes and for bonding the heat sinks together. When the assembly is made by mass production techniques, it has been noted that in certain instances the insulating compound is difficult to control in the liquid state and tends to leak or overflow from the ends of the assembly to produce undesired deposits of the compound. Accordingly, it is desirable to have a bridge rectifier assembly of the type disclosed in the aforementioned patent wherein the heat sinks are connected together by a fastener means rather than by bonding or cementing and further wherein the several parts of the assembly are readily fabricated by simple manufacturing steps.

It is an object of this invention to provide a bridge rectifier assembly in which a pair of heat sinks support first and second groups of semiconductor diodes in which the heat sinks are attached together by stud fasteners insertable into opposing slots formed in the heat sinks. In carrying forth this object the stud fasteners are carried on an insulating plate extending across one end of the assembly. The opposite end of the assembly includes a terminal board supported on spacer blocks extending from the inner side of the insulating plate and between the diodes.

A further object of this invention is to provide a bridge rectifier assembly and method for manufacture in which the assembly includes a pair of heat sinks carrying two groups of oppositely poled semiconductor diodes on support areas of facing interior walls. The pair of heat sinks are fastened together by aligning opposing slots formed in the interior walls relative to stud fasteners carried on an insulating plate providing a self-contained jig. The stud fasteners are inserted into the opposing slots as one end of each of the pair of heat sinks is pressed toward the inner side of the insulating plate. This positions a set of spacer blocks, also carried by the insulating plate, between aligned pairs of diodes with free ends of the spacer blocks disposed adjacent an opposite end of the pair of heat sinks. An insulated terminal board is attached and supported at the free ends of the spacer blocks. The diodes are enclosed within the pair of heat sinks between the insulating plate and the insulated terminal board which are held together and to the pair of heat sinks in an integral assembly.

In accordance with the present invention a bridge rectifier assembly and method of manufacture includes a pair of heat sinks forming bridge output terminals. The heat sinks include a pair of mutually facing interior walls having support areas carrying one electrode end of two oppositely poled groups of semiconductor diodes. When the pair of heat sinks are positioned so that the support areas of the interior walls are aligned, they define a center opening. An insulating plate covers one end of the opening and includes integral stud fasteners. Opposing slots are formed in the interior walls and receive the stud fasteners in interlocking relationship for attaching the pair of heat sinks together in an insulated relationship and to the insulating plate. The insulating plate further includes a set of spacer blocks extending through the center opening. The spacer blocks have coplanar shoulders terminating below free ends of the spacer blocks. An insulated terminal board carrying bridge input terminals includes apertures receiving the free ends for support mounting on the coplanar shoulders. Terminal conductors connected to an opposite electrode end of the two groups of diodes are connected in pairs to the input terminals. The terminal board is attached to the set of spacer blocks by the spindle free ends overlapping the outer side of the terminal board. In the Drawings:

Figure 1:
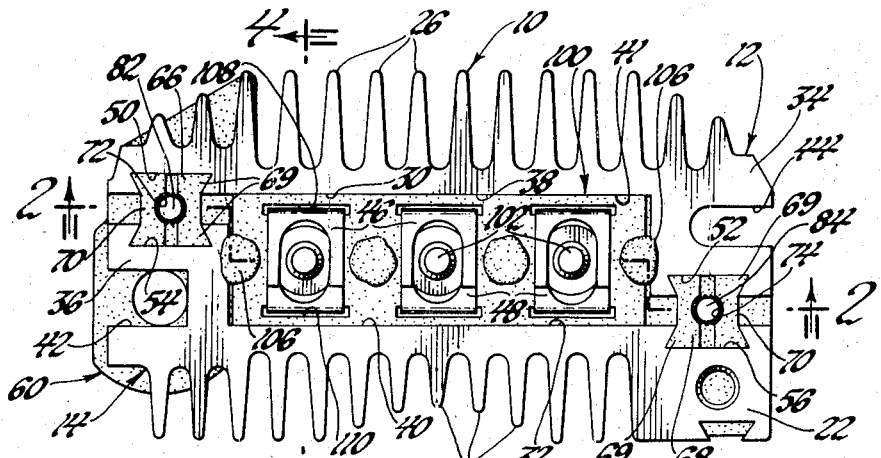
FIG. 1 is a rearward end view of a bridge rectifier assembly made in accordance with the present invention.
Figure 2:
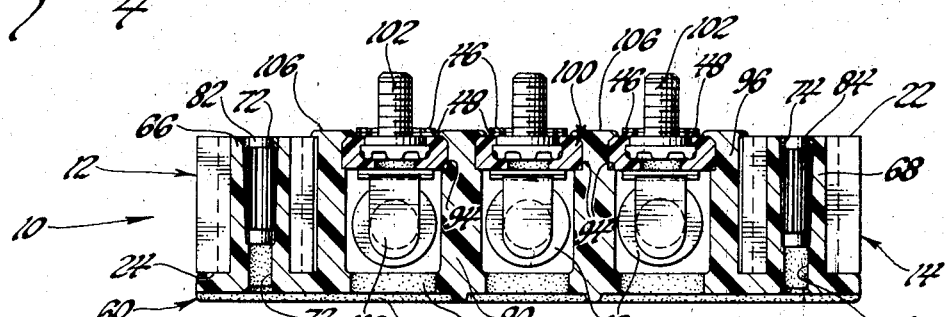
FIG. 2 is a sectional view taken along the axis 2—2 in FIG. 1, looking in the direction of the arrows.
Figure 3:
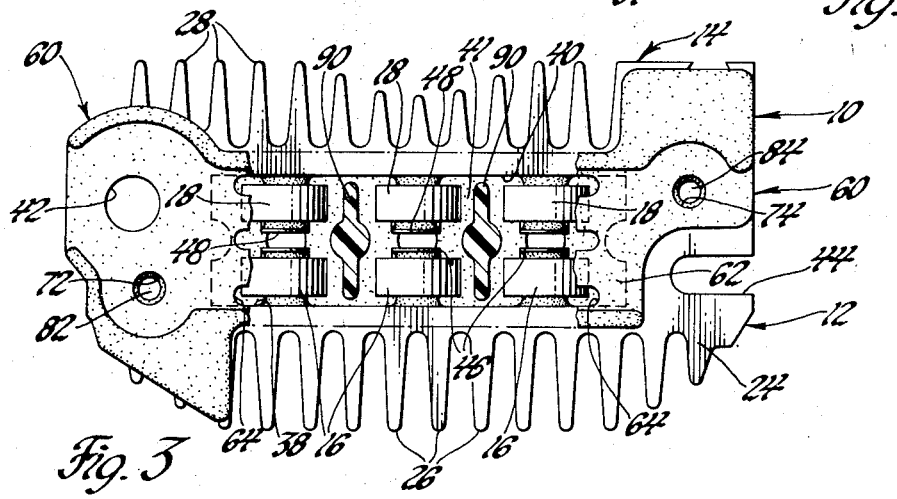
FIG. 3 is a forward end view of the bridge rectifier assembly partially in section to expose the interior of the assembly.

Referring now to the drawings, and more particularly to FIGS. 1, 2 and 3, wherein the bridge rectifier assembly of this invention is generally designated by the numeral 10. A pair of heat sinks 12 and 14 are illustrated supporting first and second groups of semiconductor diodes 16 and 18 forming the rectifier devices of the assembly 10. The pair of heat sinks 12 and 14 are made of an aluminum material formed by an extrusion process. The ends of the pair of heat sinks are flat and are cut from extruded stock so as to have the same thickness defining a common rearward end 22 shown in FIG. 1 and a common forward end 24 shown in FIG. 3.

Spaced heat radiating fins 26 and 28 are formed on the outer vertical sides of the pair of heat sinks 12 and 14 as viewed in FIGS. 1 and 3. Inner vertical sides of the pair of heat sinks form mutually facing interior walls 30 and 32 extending between the lateral sides thereof. Offset sections 34 and 36 at opposite lateral sides of the pair of heat sinks 12 and 14, respectively, define support areas 38 and 40 therebetween on the interior walls 30 and 32 carrying the two groups of diodes 16 and 18, respectively. This arrangement further defines a rectangular shaped center opening 41 extending through the rearward and forward ends 22 and 24 for receiving the first and second groups of diodes 16 and 18.

A side opening 42 extends into one side of the assembly 10 at the offset section 36 and a further side opening 44 extends into the other side of the assembly 10 at the offset section 34 and opposite the slot 42. The side openings 42 and 44 are utilized to mount the bridge rectifier assembly 10 to a support surface and for attaching terminal members, not shown, for providing direct current output connections at the assembly 10. These terminal members are poled in accordance with the polarity of the heat sink 12 which forms a negative bridge output terminal, in one preferred embodiment, and with the polarity of the heat sink 14 which forms a positive bridge output terminal. The pair of heat sinks 12 and 14 correspond to similarly constructed heat sinks described in the aforementioned U.S. Pat. No. 3,538,362 issued Nov. 3, 1970 to R. A. Cheetham et al., and assigned to the assignee of this invention. The openings 42 and 44 are utilized, as in the embodiment shown in this patent, for mounting the bridge rectifier assembly 10 to an end frame within the housing of a motor vehicle alternating current generator. For example, the opening 42 receives a positive terminal member and the opening 44 receives a negative terminal member also connecting the bridge rectifier assembly 10 to a source of ground potential as described in the aforementioned patent.

The first and second groups of diodes 16 and 18 are arranged on the substantially flat and parallel support areas 38 and 40 in straight alignment and each diode of one group is axially aligned with a diode of the other group to form axially aligned pairs of diodes. The semiconductor diodes in the first and second groups of diodes 16 and 18 are of the silicon type in one preferred embodiment as illustrated in FIG. 3. The diodes are electrically connected as illustrated in the electrical schematic diagram of FIG. 6. The diodes have a button-like configuration having anode and cathode electrode ends disposed on opposite ends thereof. The common anode ends of the first group of diodes 16 are mounted by a conductive soldering technique to the support area 38. Similarly, the common cathode electrode ends of the group of diodes 18 are mounted in an aligned relationship on the support area 40 by soldering.

Figure 5:
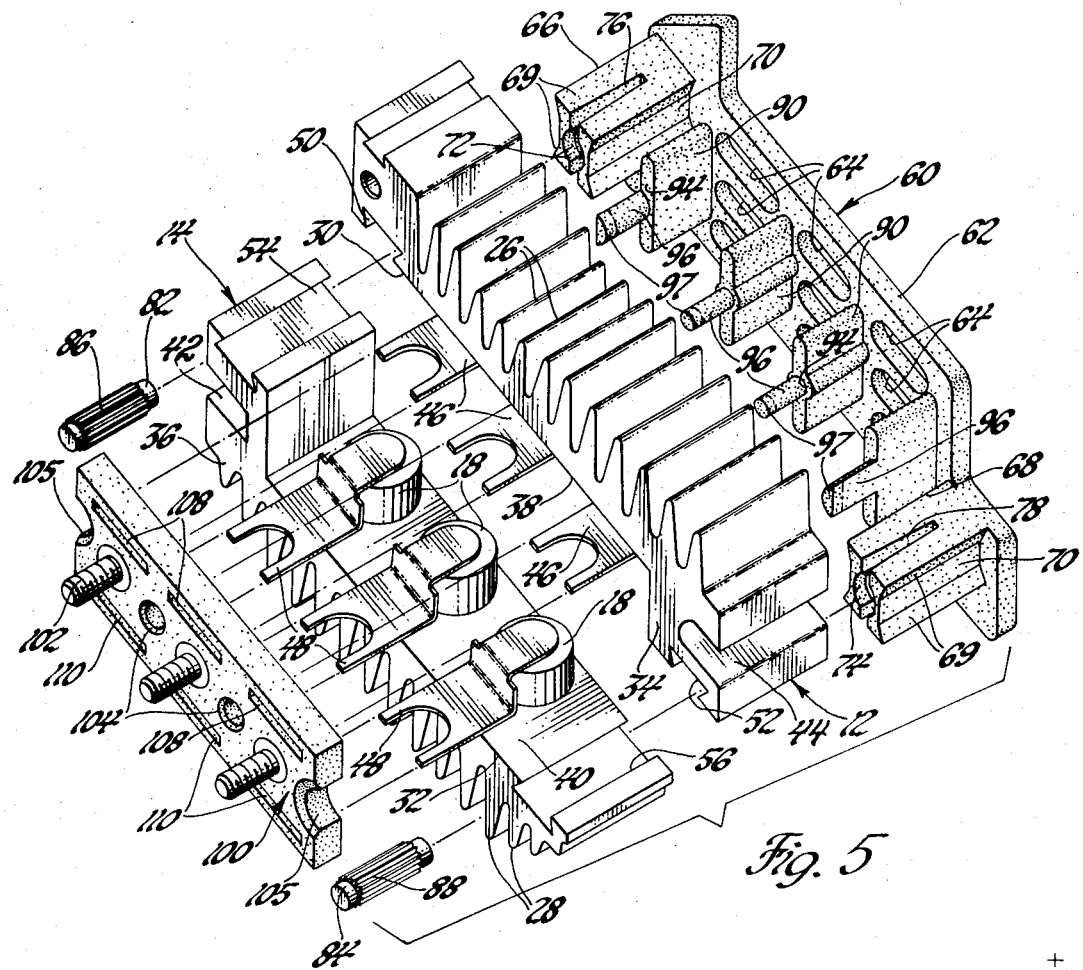
FIG. 5 is an exploded view of the parts of the bridge rectifier assembly of this invention prior to fabrication in the final form shown in FIGS. 1, 2, 3 and 4.

Terminal straps 46 are attached to the common cathode ends of the first group of diodes 16 and similar terminal straps 48 are attached to the common anode ends of the second group of diodes 18. The terminal straps 46 and 48, as shown in FIG. 5, include thin strips of conductive material having offset inner ends connected to the electrode ends and outer notched ends extending from the center opening 41. In the final assembled form, the notched ends are bent over the rearward end 22 of the assembly 10 as shown in FIGS. 1, 2 and 3 as described more fully hereinbelow.

A pair of dovetail slots 50 and 52 are recessed in the interior wall 30 at opposite sides of the support area 38 with the slot 52 included in the offset section 34. A pair of dovetail slots 54 and 56 are formed in the interior wall 32 which are located opposite the slots 50 and 52, respectively. Each of the dovetail slots 50, 52, 54 and 56 are identical and have side walls which diverge from either of the interior walls 30 or 32 and terminate at a substantially flat bottom extending parallel to each other and axially between the ends of the pair of heat sinks 12 and 14. The opposing pairs of dovetail slots 50-54 and 52-56 are adapted to receive a fastener means insertable therein as described more fully hereinafter.

An insulating plate 60 extending across the forward end 24 of the pair of heat sinks 12 and 14 is made of a molded insulating plastic material. The insulating plate 60 includes a base 62 which is substantially flat. The base 62 covers the forward end of the center opening 41 at the forward assembly end 24 and includes a series of ventilating openings 64 aligned with the diodes. Air passing through the ventilating openings 64 aids in cooling the groups of diodes. The base 62 of the insulating plate 60 extends to the lateral sides of the pair of heat sinks 12 and 14 and the vertical length of the base 62 is such that it does not cover the heat radiating fins 26 and 28. The base 62 further serves to insulate the assembly 10 from a support surface, such as an end frame of a motor vehicle generator.

First and second stud fasteners 66 and 68 are formed integrally on the inner side of the base 62 at the opposite lateral sides thereof so as to extend perpendicular to the base 62. The cross-sectional configuration of each of the first and second stud fasteners 66 and 68 include dovetail projections 69 complementary to the slots 50, 52, 54 and 56 on opposite vertical sides of the fasteners 66 and 68. A pair of flat spacer sections 70 extend along the lateral sides of each stud fastener 66 and 68 to separate the pair of heat sinks 12 and 14 and enclose the lateral sides of the center opening 41 when the stud fasteners 66 and 68 are mounted in the dovetail slots 50, 52, 54 and 56. Axial holes 72 and 74 extend through the longitudinal axes of the stud fasteners 66 and 68, respectively, and the base 62. Transverse slots 76 and 78 extend from the outer ends of the stud fasteners 66 and 68 partially along the axis of the holes 72 and 74. These transverse slots 76 and 78 form resilient bifurcated shank parts at the outer ends of the stud fasteners 66 and 68.

A pair of wedging pins 82 and 84 having radial extending ribs 86 and 88 are drivable into the axial holes 72 and 74 so as to spread the shank parts of the stud fasteners 66 and 68. These pins 82 and 84 clamp the stud fasteners 66 and 68 within the opposing pairs of slots 50-54 and 52-56. Accordingly, the insulating plate 60 is clamped by the stud fasteners 66 and 68 to the heat sinks 12 and 14 and, in turn, the heat sinks are attached to each other in an insulated relationship.

The insulating plate 60 further includes a set of spacer blocks 90 extending from the inner side of the base 62 of insulating plate 60 in parallel relationship to each other and to the stud fasteners 66 and 68. The spacer blocks 90 are positioned so as to extend between each axially aligned pairs of diodes formed by the groups of diodes 16 and 18 and also on the outer sides thereof. Each of the spacer blocks 90 define coplanar shoulders 94 extending substantially parallel and slightly below to the rearward end of the heat sinks 12 and 14 as shown in FIG. 2. The set of spacer blocks 90 terminate at free ends including spindles 96 extending from the center of the shoulders 94 slightly past rearward end 22 of the heat sinks 12 and 14. The inner ones of the spindles 96 have the cylindrical form shown in FIG. 5 and the two outer ones of the spindles 96 have a semi-cylindrical form. Prior to final fabrication of the assembly 10, the tip portions 97 extend beyond the rearward end 22 of the heat sinks.

A terminal board 100 made of a plastic insulating material and having a substantially rectangular shape complementary to the shape of the center opening 41 is mounted at the rearward end 22 of the pair of heat sinks 12 and 14. The terminal board 100 fits along support areas 38 and 40 of the interior walls 30 and 32 and between the offset sections 34 and 36 within the center opening 41. The outer side of the terminal board 100 is substantially flush with the rearward end of the heat sinks 12 and 14. Threaded stud input terminals 102 are molded in the terminal board 100 so that the threaded parts thereof extend outward. The stud input terminals are in a substantial straight lateral alignment with each other so as to be substantially axially aligned with each axially aligned pair of diodes. Inner circular apertures 104 extend through the center of the terminal board 100 between the stud input terminals 102 and an outer pair of semi-circular slot apertures 105 extend into the opposite lateral sides of the board 100 for receiving the spindles 96. Heads 106 are formed by deforming the tip portions 97 radially outward from the spindles 96 by heating and then pressing the tip portions 97 axially toward the terminal board 100. The heads 106 overlap the outer side of the terminal board in opposing relationship to the shoulders 94 supporting the inner side of the terminal board 100. This arrangement clamps the terminal board 100 to the set of spacer blocks 90.

Figure 4:
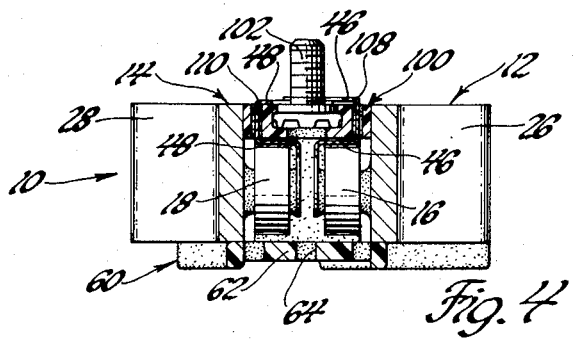
FIG. 4 is a sectional view taken along the axis 4—4 in FIG. 1, looking in the direction of the arrows.

Two oppositely disposed rows of slit openings 108 and 110 also extend through the terminal board 100 at opposite sides of each of the stud input terminals 102. The terminal straps 48 and 46 are arranged in axial alignment with the slits 108 and 110, respectively, and extend through the slits. The terminal straps 48 and 46 are bent over the outer side of the terminal board 100 so that the notched portions of the terminal straps 48 and 46 receive the terminal studs as shown in FIGS. 1, 2 and 4. Accordingly, the terminal straps 46 and 48 of each axially aligned pairs of diodes are oriented to be electrically connected together and to one of the stud input terminals 102 when nuts are secured thereto. The input terminals 102 are adapted to receive connections from an alternating current source provided by wire leads, for example, connected to the output windings of an alternator as described in connection with FIG. 6.

Figure 6:
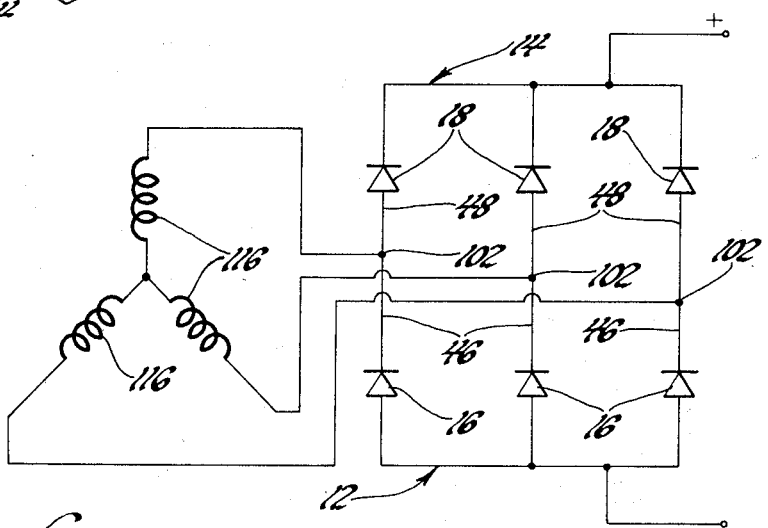
FIG. 6 is a schematic circuit diagram of the bridge rectifier assembly of this invention as it is connected to an alternating current electrical source.

Referring now in particular to the schematic circuit diagram shown in FIG. 6, the anode ends of the group of diodes 16 are connected together by the mounting on the heat sink 12 and the cathode ends of the group of diodes 18 are connected together by the mounting on the heat sink 14. Each cathode end of the group of diodes 16 is connected to one of the stud input terminals 102 and each anode of the group of diodes 18 is also connected to one of the stud input terminals 102 by the terminal straps 48 and 46 being connected in pairs at the stud input terminals 102. This forms a full wave rectifier bridge circuit configuration wherein the stud input terminals 102 form the alternating current bridge input terminals and the heat sinks 12 and 14 provide negative and positive direct current bridge output terminals, as noted hereinabove. When the rectifier bridge assembly 10 is connected to an alternating current source formed by the three phase output windings 116 of a motor vehicle generator, for example, each phase of the output windings 116 is connected to one of the stud input terminals 102. In this instance, there are three diodes provided in each of the first and second groups of diodes 16 and 18. Correspondingly, there are three pairs of axially aligned diodes formed by the groups of diodes 16 and 18 and three stud input terminals 102 as shown in the drawings.

To fabricate the bridge rectifier assembly 10 in accordance with the method of manufacture of this invention, the parts described hereinabove are provided as shown in FIG. 5. The insulating plate 60 forms a convenient and self-contained jig for positioning and guiding the various parts of the assembly 10 for fabrication into an integral assembly. The insulating plate 60 is positioned with the outer side of the base 62 laid flat on a support surface. The stud fasteners 66 and 68 and the set of spacer blocks 90 are then positioned for receiving the pair of heat sinks 12 and 14. One of the pair of heat sinks 12 and 14, for example heat sink 12, is positioned over the inner side of the base 62 so that each of the dovetail slots 50 and 52 thereof are axially aligned with the ends of the stud fasteners 66 and 68. The heat sink 12 is then pressed toward the base 64 as each of the slots 50 and 52 receive one of the dovetail projections 69 on each of the stud fasteners 66 and 68. The heat sink 12 is finally positioned when the forward end 24 rests against the inner side of the base 62. Correspondingly, the other heat sink 14 is axially aligned with its dovetail slots 54 and 56 aligned with the ends of the stud fasteners 66 and 68. The heat sink 14 is then pressed toward the base 62 so that the dovetail slots 54 and 56 receive the other of the dovetail projections 69 on each of the stud fasteners 66 and 68. Concurrently, the set of spacer blocks are positioned adjacent to the axially aligned pairs of diodes in the group of diodes 16 and 18.

The terminal board 100 is then positioned, with the stud input terminals 102 extending outward, over the pair of heat sinks 12 and 14 so that the two rows of slits 108 and 110 are mutually aligned with the terminal straps 46 and 48, respectively, which extend perpendicularly from ends of the pair of heat sinks 12 and 14, as shown in FIG. 5. Concurrently, the circular apertures 104 and semicircular slot apertures 105 are axially aligned with the spindle 96 of the set of spacer blocks 90. The terminal block 100 is then moved toward the set of spacer blocks 90 so that the slits 108 and 110 and apertures 104 and 105 receive the terminal straps 46 and 48 and the spindle free ends 96, respectively. The terminal board 100 is pressed onto the shoulders 94 of the set of spacer blocks 90. As shown in FIG. 4, in this position the terminal board 100 covers the rearward end of the center opening 41 and is substantially flush aligned with the rearward end 22 of the pair of heat sinks 12 and 14.

Thereafter, the terminal straps 46 and 48 are bent at the outer junctures with the rows of slits 108 and 110 and toward each other and the stud input terminals 102 as shown in FIG. 4. The notches in the ends of the terminal straps 46 and 48 extend partially around the stud input terminals 102. This places one of the terminal straps 46 in an overlapping relationship with the one of the terminal straps 48. Normally, nuts are not placed on the input terminals 102 to connect a pair of the terminal straps 46 and 48 together and to one of the input terminals 102 until the assembly 10 is mounted in a generator.

In this state of the fabrication of the bridge rectifier assembly 10, the tip portions 97 of the spindles 96 extend slightly beyond the outer side of the terminal board 100. A heated punch-like tool is axially aligned with the ends of the spindles 96 and is pressed thereagainst so that the tip portions 97 are heated to a plastic state and are deformed by pressing the tool toward the outer side of the terminal board 100. The head 106 is formed from the tip portions 97 in overlapping relationship over the edges of the apertures 104 and 105 and the terminal board 100. FIG. 2 illustrates heads 106 formed on the ends of the spindles 96 following the heated pressing of the tip portions 97. This locks the terminal board 100 in place against the shoulders 94 of the set of spacer blocks 90 and to the insulating plate 60 which in turn is locked in place to the pair of heat sinks 12 and 14 by the stud fasteners 66 and 68 having been inserted in interlocking relationship with the pairs of opposing slots 50-54 and 52-56.

The wedging pins 82 and 84 are then applied to the axial holes 72 and 74 in the stud fasteners 66 and 68 and pressed therein so that the ribs 84 and 86 spread the sides of the end shank parts of the stud fasteners 66 and 68, as illustrated in FIG. 2. The tight press fit of the wedging pins 82 and 84 in the holes 72 and 74 prevents them from falling out and therefore tightly clamps the stud fasteners 66 and 68 in tight interlocking relationship with the pairs of opposing slots 50-54 and 52-56.

It is to be understood that the embodiment of the bridge rectifier assembly described hereinabove is a preferred embodiment and that it is contemplated that other obvious modifications may be made without departing from the scope of this invention.

What is claimed is:

1. A bridge rectifier assembly comprising: first and second groups of semiconductor diodes having anode and cathode ends; terminal strap conductors connected to the cathode ends of said first group of diodes and to the anode ends of said second group of diodes; a pair of heat sinks made of a conductive metal material, each of said pair of heat sinks including an outer heat radiating side and an inner side defining an interior wall, said interior walls being positioned in a spaced relationship so as to define a center opening receiving said first and second groups of diodes, said anode ends of said first group of diodes being mounted on one of said interior walls and said cathode ends of said second group of diodes being mounted on the other of said interior walls such that said strap conductors extend in a common direction through said center opening; a pair of slots formed in each interior wall with the slots in one interior wall opposing the slots in the other interior wall; an insulating plate including a base extending across one end of said center opening; a pair of stud fasteners integral with said base and received in interlocking relationship between opposing slots attaching said pair of heat sinks together in said spaced relationship and to said insulating plate; a set of spacer blocks integral with said base and extending through said center opening in a parallel relationship to said pair of stud fasteners; said spacer blocks having coplanar shoulder parts and terminating at free ends extending beyond said coplanar shoulder parts; a terminal board carrying input terminal members extending across the other end of said center opening, said terminal board including apertures receiving said free ends and two rows of openings receiving said strap conductors so as to mount said terminal board on said shoulder parts, said free ends being deformed in overlapping relationship with said terminal board so as to clamp said terminal board to said set of spacer blocks, whereby said strap conductors are positioned for connection to said input terminal members so as to connect said first and second groups of diodes in a predetermined bridge rectifier circuit configuration between said input terminal members and said pair of heat sinks.

2. A bridge rectifier assembly comprising: first and second groups of semiconductor diodes having anode and cathode ends; terminal strap conductors connected to said cathode ends of said first group of diodes and to said anode ends of said second group of diodes; a pair of heat sinks made of an extruded aluminum material, each of said pair of heat sinks including a heat radiating fin extending from an outer vertical side and an interior wall extending along an inner vertical surface between opposite lateral sides of said pair of heat sinks, each interior wall having a support area extending through opposite ends of said pair of heat sinks with the support areas positioned in a facing spaced relationship so as to define a center opening receiving said first and second groups of diodes, said anode ends of said first group of diodes being connected to one support area and said cathode ends of said second group of diodes being connected to the other support area so that axially aligned pairs of diodes are formed within said first and second groups of diodes, and further so that said terminal strap conductors extend in a common direction from said center opening at a first end of said pair of heat sinks; a pair of dovetail slots recessed into each interior wall so as to extend through said opposite ends of said pair of heat sinks, each dovetail slot in one interior wall opposing a dovetail slot in the other interior wall so as to form opposing pairs of dovetail slots; an insulating plate including a flat base part having ventilating openings extending between the lateral sides of said pair of heat sinks and across said center opening at a second end of said pair of heat sinks so that said ventilating openings are aligned with said center opening; a pair of stud fasteners integral with said base part, each stud fastener having oppositely disposed dovetail projections and a spacer section therebetween, each stud fastener further having bifurcated shank end parts and an axial hole extending along the longitudinal axis of each stud fastener, whereby opposing dovetail slots receive said pair of stud fasteners in interlocking relationship for attaching said pair of heat sinks together with said spacer sections maintaining said pair of heat sinks in a spaced relationship; a set of spacer blocks formed integral with said base part and located between said pair of stud fasteners so as to extend through said center opening and between each of said axially aligned pairs of diodes, said set of spacer blocks having coplanar shoulders and spindles extending from said shoulders so as to terminate beyond said first end of said pair of heat sinks; a terminal board carrying stud input terminals, said terminal board including a cross sectional shape corresponding to said center opening for insertion therein, said terminal board further including a series of apertures receiving said spindles to expose tip portions thereof and two rows of slit openings receiving said terminal strap conductors on opposite sides of said stud input terminals, said terminal board being received within said center opening for support by said coplanar shoulders when spindles and said terminal strap conductors are received by said apertures and said slit openings, respectively, with said terminal strap conductors being connected in opposite pairs to each stud input terminal, and said exposed tip portions of said spindles being deformed into radial head parts overlapping and clamping said terminal block to said shoulders; and a pair of wedging pins inserted into said axial holes of said pair of stud fasteners so as to urge said shank end parts apart and securely clamp said pair of stud fasteners within said opposing pairs of dovetail slots.

3. In a method of manufacture for a bridge rectifier assembly having a pair of heat sinks each carrying a group of diodes poled oppositely from the group of diodes carried by the other heat sink, wherein each heat sink includes a pair of recessed slots with each recessed slot of one heat sink being positional opposite a recessed slot of the other heat sink to form an opposing pair of slots for attaching said pair of heat sinks together, the steps comprising: providing an insulating plate including a pair of stud fasteners complementary to said opposing pairs of recessed slots for interlocking insertion therein and further including a set of spacer blocks located between said stud fasteners, said set of spacer blocks forming shoulder parts and terminating at free ends extending axially from said shoulder parts; positioning each of said pairs of heat sinks so that each of said recessed slots is axially aligned with said pair of stud fasteners; inserting said pair of stud fasteners into said opposing pairs of slots so as to attach said heat sinks together in a spaced insulated relationship and to said insulating plate and further so as to concurrently position said set of spacer blocks between said pair of heat sinks with said shoulder parts being positioned adjacent an end of said pair of heat sinks opposite from an end receiving said stud fasteners; providing a terminal board having apertures complementary to said free ends and terminal members adapted for connection to each group of diodes; mounting an inner side of the terminal board on said shoulder parts by inserting said free ends at the outer side of said terminal board, and deforming said tip portions against the outer side of said terminal board and into overlapping heads so as to clamp said terminal board against said shoulder parts.

4. In a method of manufacture for a bridge rectifier assembly including first and second groups of semiconductor diodes having anode and cathode ends, the steps comprising: providing a pair of heat sinks wherein each heat sink includes an inner side forming an interior wall having a pair of dovetail slots and a support area extending laterally between said pair of dovetail slots; connecting said anode ends of said first group of diodes on said support area of one heat sink and the cathode ends of said second group of diodes on the said support area of the other heat sink; connecting a strap conductor on each of the remaining cathode ends and anode ends of the diodes such that the strap conductors extend in a common direction; positioning said interior walls in facing spaced relationship so that a dovetail slot in one interior side opposes a dovetail slot in the other interior side and the support areas define a center opening extending through the ends of said pair of heat sinks; providing an insulating plate including a flat base part, a pair of stud fasteners and a set of spacer blocks, each of the stud fasteners and spacer blocks being integrally attached to said base part and extending in parallel relationship such that said spacer blocks are located between said pair of stud fasteners, each stud fastener being shaped complementary to opposing dovetail slots for interlocking insertion therein, and each spacer block having a shoulder part aligned in coplanar relationship with shoulder parts of the other spacer blocks and further having a spindle part extending axially from each shoulder part for terminating the outer end of each spacer block; sliding said pair of dovetail slots of one heat sink along common sides of said pair of stud fasteners in said interlocking relationship so that one end of said one heat sink abuts said base part with said strap conductors extending beyond the other end of said one heat sink with each spacer block extending adjacent to the diodes mounted on said support area of said one heat sink; sliding said pair of dovetail slots of the other heat sink along an opposite common side of said pair of stud fasteners in said interlocking relationship so that one end of said other heat sink abuts said base part with said strap conductors extending beyond the other end of said other heat sink with each spacer block extending adjacent to the diodes mounted on said support area of said other heat sink, whereby said base part of said insulating plate extends across one end of said center opening and said shoulder parts and spindle parts are disposed toward the other end of said center opening; providing a terminal board made of a plastic insulating material and including terminal members extending on an outer side thereof, said terminal board further including apertures for receiving said spindle parts and two rows of aligned openings on opposite sides of said terminal members for receiving said strap conductors; sliding said apertures and said two rows of aligned openings of said terminal board onto said spindle parts and said strap conductors, respectively, so as to position the inner side of said terminal board against said shoulder parts and across the opposite side os said center opening, whereby the ends of said strap conductors and tip portions of said spindle parts extend through the outer side of said terminal board; positioning opposite pairs of the ends of said strap conductors adjacent one of said terminal members by bending the ends toward each other into mutually overlapping relationship; and heat deforming said tip portions of said spindle parts so as to overlap the outer side of said terminal board and clamp said terminal board to said set of spacer blocks.

* * * * *